Jan. 12, 1965     M. QUENOT     3,164,907
METAL TAPE LINEAR MEASURING DEVICE
Filed Aug. 23, 1962

INVENTOR
Michel Quenot

BY *Holcombe, Wetherill & Brisebois*
ATTORNEYS 3,164,907
METAL TAPE LINEAR MEASURING DEVICE
Michel Quenot, Besancon, Doubs, France, assignor to Etablissements Quenot & Cie, Besancon, Doubs, France
Filed Aug. 23, 1962, Ser. No. 219,055
Claims priority, application France, Aug. 30, 1961, 871,901, Patent 1,306,082
2 Claims. (Cl. 33—138)

Metal tape linear measuring instruments comprise a tape adapted to wind up inside a case; in certain applications, it is convenient to lock the tape in its momentary position, either inside the case or when it is more or less extracted therefrom.

It is the object of this invention to provide a linear measuring device of this general type comprising very simple means for automatically locking the tape in any desired position.

To this end the bottom wall of the case, of which one end adjacent to the tape outlet aperture acts as a tape guide, is pivotally mounted intermediate its ends about a pivot axis, and a compression coil spring adjacent to the end opposite to the tape outlet aperture constantly urges this bottom wall for pivoting about said axis and causing the opposite end of the wall to move inwardly and thus exert on the tape a resilient pressure adapted to lock the tape in its momentary position.

The attached drawing illustrates by way of example a typical form of embodiment of the invention. In the drawing.

Figure 1:
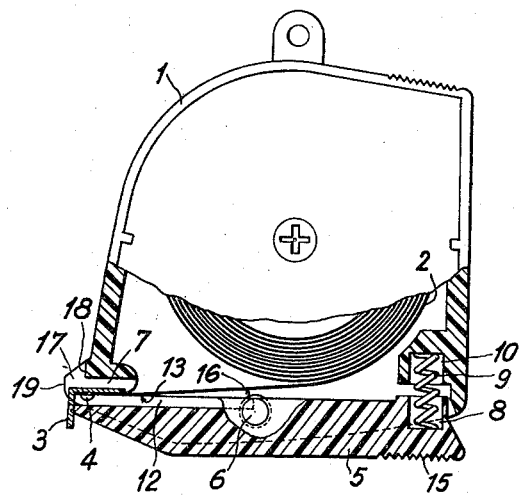
FIGURE 1 is a side elevational view of the device with parts broken away.
Figure 2:
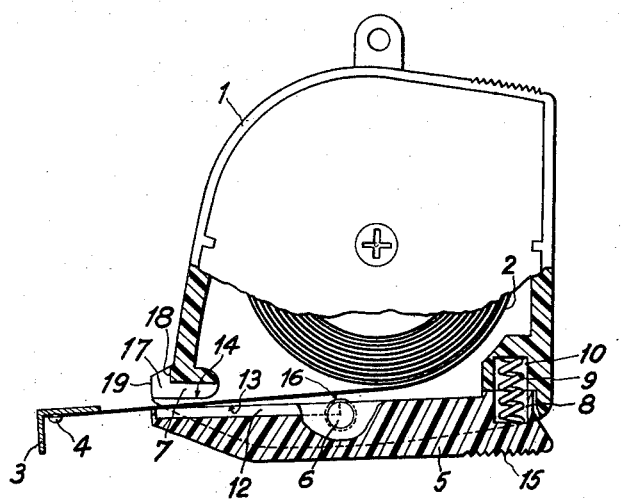
FIGURE 2 is a view similar to FIG. 1 but showing the locking device in its inoperative position.

The measuring device illustrated comprises a case 1 having wound therein a tape 2 ending with a pull-out hook 3 also acting as a means for preventing the tape end from winding completely in the case, this hook 3 being secured on the outer end of the metal tape 2 by means of rivets 4.

The bottom wall 5 of the case 1 is pivotally mounted about a pivot axis 6 and has formed in its end opposite to the tape outlet aperture 7 a blind hole 8 for receiving one end of a compression coil spring 9 having its other end engaged in another blind hole 10 formed in the case 1, as shown; in the front portion of the bottom wall 5 a longitudinal groove 12 is formed for permitting the passage of the rivets 4 fastening the hook 3 on the outer end of tape 2.

Due to the resilient pressure exerted by the coil spring 11 the bottom wall 5 of case 1 which is pivoted at 6 engages with its edges 13 on either side of the aforesaid central groove 12 the tape 2 so as to press same against the upper face of the tape outlet aperture 7.

Thus, the tape 2 is normally locked in its selected or momentary position.

When it is desired to make a measurement, the bottom wall 5 of the case is depressed on the end portion opposite the tape outlet aperture 7, adequate indentations 15 being formed for this purpose on the outer face of this end portion; thus, the coil spring 11 is compressed and the bottom wall 5 is pivoted about its pivot pin 6 so that the edges 13 on the opposite end portion of wall 5 are moved away from the edges 14 of the outlet aperture 7 and the tape 2 is thus free to move in either direction.

This locking device is particularly useful in a measuring instrument of the type comprising a spiral spring for automatically rewinding the tape inside the case 1.

In the specific form of embodiment illustrated in the drawing the bottom wall 5 of the case is formed on either side with integrally molded studs 6 constituting the aforesaid pivot pin, and the lateral faces of the case are formed with holes 16 engaged by these studs and constituting the bearings thereof.

Thus, the manufacture and assembly of the device are particularly simple.

Figure 3:
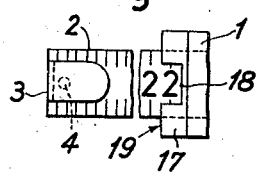
FIGURE 3 is a fragmentary plan view from above.

To facilitate the measurement of internal dimensions, that is, the distance between two walls which is made by disposing the measuring instrument between these walls so that the rear face of the device engages one wall and the tape end, that is, the hook 3, engages the opposite wall, the front wall of the instrument has a beak-shaped projection 17, with a rectangular notch 18 in the front or outer end of the beak, the width and length of this notch being slightly greater than those of the figures carried by the tape so that the user may easily read them as they move past the reference mark or line 19, in this case the outer end of beak 17; thus, to calculate an inner measurement or dimension, the user firstly reads the number of graduation line registering with the reference mark or line 19 (22 in the case illustrated in FIG. 3) and adds to this value the length measured from this reference mark to the rear face of the case, for example 2 inches, this length being printed directly on the case, for example as follows "+2 inches."

However, it will be readily understood by anybody conversant with the art that the form of embodiment illustrated and described herein should not be construed as limiting the invention as many modifications and alterations may be brought thereto without departing from the spirit and scope of the invention as set forth in the appended claims.

What I claim is:

1. A case for a coiled measuring tape carrying scale figures, comprising a main downwardly open section including front, upper, rear, and side walls, the lower edge of the front wall serving as a guide for the outer end of the tape, a spindle extending in parallelism with said lower edge of the front wall between the side walls of the case and carrying the tape, a bottom section extending between the lower edges of the side walls, from the lower edge of the front wall to that of the rear wall to close the main downwardly open section, an axis extending approximately between the middles of the lower edges of the side walls around which said bottom section can pivot, and elastic means carried by the lower part of said rear wall slightly away from its lower edge cooperating with the rear end of the bottom section to make the front part of said bottom section engage the lower edge of the front wall and clamp normally the tape between it and the last-mentioned edge.

2. A case for a coiled measuring tape carrying scale figures, comprising a main downwardly open section including front, upper, rear, and side walls, the lower edge of the front wall serving as a guide for the outer end of the tape, a spindle extending in parallelism with said lower edge of the front wall between the side walls of the case and carrying the tape, a bottom section extending between the lower edges of the side walls, from the lower edge of the front wall to that of the rear wall to close the main downwardly open section, an axis parallel with said spindle approximately between the middles of the lower edges of the side walls around which said bottom section can pivot, said bottom section being provided with a blind bore registering with a point of the main section slightly inside said rear wall, a projection rigid with the inner surface of the rear wall near the lower edge of the latter and provided with a blind bore registering with that in the bottom section and a coil spring fitted in said cooperating blind bores and urging the bottom section slightly away from the lower edge of the rear wall to make the front part of the bottom section engage the lower edge of the front wall and clamp the tape between it and the last-mentioned edge.

References Cited by the Examiner

UNITED STATES PATENTS

| | | | |
|---|---|---|---|
| 1,100,325 | 6/14 | Pronovost | 33—137 |
| 1,259,886 | 3/18 | McLeod | 33—138 |
| 2,076,704 | 4/37 | Carlson | 33—138 |
| 2,512,042 | 6/50 | Stern | 33—143 |
| 2,575,354 | 11/51 | Mills | 33—138 |
| 2,814,881 | 12/57 | Ljungberg | 33—138 |
| 3,041,004 | 6/62 | Busch | 33—138 |

FOREIGN PATENTS 859,955   6/54   Germany.

ISAAC LISANN, *Primary Examiner*.